United States Patent

Manni

[11] Patent Number: 5,972,260
[45] Date of Patent: Oct. 26, 1999

[54] PROCESS FOR VACUUM FOAMING OF PANELS

[75] Inventor: Luciano Manni, Bagnolo S. Vito, Italy

[73] Assignee: Manni S.p.A., S. Biagio di Bagnolo S. Vito, Italy

[21] Appl. No.: 08/991,438

[22] Filed: Dec. 16, 1997

[30] Foreign Application Priority Data

Dec. 19, 1996 [IT] Italy .................................. MI96A2673

[51] Int. Cl.[6] .............................. B29C 44/06; B29C 44/12
[52] U.S. Cl. .............................. 264/46.5; 264/53; 264/102
[58] Field of Search .................... 264/46.5, 102, 264/53; 425/4 R

[56] References Cited

U.S. PATENT DOCUMENTS

| | | | |
|---|---|---|---|
| 3,265,783 | 8/1966 | Jacobs | 264/46.5 |
| 3,402,520 | 9/1968 | Lee et al. | 264/46.5 |
| 3,605,365 | 9/1971 | Hastings | 264/46.5 |
| 3,778,492 | 12/1973 | Lemons | 264/46.5 |
| 3,834,962 | 9/1974 | Strumbos | 264/46.5 |
| 4,036,923 | 7/1977 | Saidla | 264/46.5 |
| 4,043,719 | 8/1977 | Jones | 264/46.5 |
| 4,784,814 | 11/1988 | Diethelm et al. | 264/102 |
| 4,821,399 | 4/1989 | Markley et al. | 264/46.5 |
| 4,965,030 | 10/1990 | Thorn | 264/46.5 |
| 5,358,395 | 10/1994 | Hane | 425/4 R |
| 5,704,107 | 1/1998 | Schmidt et al. | |
| 5,711,905 | 1/1998 | Behl | 425/4 R |

FOREIGN PATENT DOCUMENTS

| | | | |
|---|---|---|---|
| 36 01 290 | 7/1987 | Germany | 264/46.5 |
| 54-127973 | 10/1979 | Japan | 264/46.5 |
| 57-113040 | 7/1982 | Japan | 264/46.5 |

*Primary Examiner*—Allan R. Kuhns
*Attorney, Agent, or Firm*—Young & Thompson

[57] ABSTRACT

A process and an apparatus for blowing in inert gas and vacuum foaming of insulting panels: an upper shell and a lower shell defining the outer in-sight surfaces and a foaming cavity of a panel, are positioned between the opposing platens of a press, together with a peripheral frame for retaining the foam; the frame comprises an interior channel connected to the foaming cavity of the panel, respectively to an annular manifold arranged in one of the press platens. At first, air in the foaming cavity is removed by blowing in an inert gas through the interior channel of the foam retaining frame; successively the foaming cavity is connected to a vacuum source and a metered quantity of a polyurethane mixture with a pentane blowing agent is injected, allowing the mixture to flow and foam in the panel under the vacuum effect.

6 Claims, 4 Drawing Sheets

PROCESS FOR VACUUM FOAMING OF PANELS

BACKGROUND OF THE INVENTION

The present invention refers to a process as well as to an apparatus for vacuum assisted foaming of panels comprising exterior shells and an intermediate structural foam core of polyurethane material adhered to both shells.

PRIOR ART

An insulating panel substantially comprises two exterior shells, of iron sheet or other suitable material, connected to an intermediate core of polyurethane foam having a specific thermal conductivity and density which are depending on the expected final use for each single panel.

An insulating panel of the above mentioned type, conventionally is provided by arranging two spaced apart exterior shells between the planes of a press, or jig, inside a peripheral frame for retaining the foam, and successively feeding a polyurethane mixture with a blowing agent, such as a pentane, into the so defined foaming cavity of the panel, at atmospheric pressure and in the presence of air.

The use of conventional foaming technologies in manufacturing panels in general requires a certain extra-charge of polyurethane in order to obtain a complete filling up of the panel cavity, and a suitable distribution of the mechanical and thermal properties. Generally, at the end of the expansion phase of the foam, the panel is to be maintained between the planes of the press or jig for a long period of time to oppose the thrust exerted by the same polyurethane material during foaming, as an anticipated removal of the panel would cause an unacceptable post-expansion and bulging of the same.

To avoid bulging U.S. Pat. No. 4,743,485 suggests the use of venting channels on the shells, formed by string members of open cell foam rods bonded on the inner surface of a shell or by a removable string member which is pulled out after solidification of the foam core; neither vacuum assisted molding nor the use of pentane blowing and related problems are described or suggested in this document.

U.S. Pat. No. 3,090,078 describes again a process for foaming panels in situ, in which manual operations are eliminated assuring the production of panels having uniformity of thickness for the foam core bonded to the exterior skin and to a peripheral frame for retaining the foam and secured to the same panel. According to this document, the skin is retained by suction resting against the surfaces of a pair platens during panel foaming.

A foaming resin is spread inside the foaming cavity of the panel, by a set of nozzles through an access opening provided in one of the barrier elements defining the peripheral frame. The resin is spread by retreating the nozzles from the opposite side of the cavity: if desired an additional blowing agent such as sodium bicarbonate or sulphonate hydrocarbons may be used in the foamable resin composition. Although vacuum use is suggested to retain the skin against the platens, again neither vacuum assisted molding nor the use of pentane blowing agent are suggested or described in this document.

It is also known to use auxiliary blowing agents, in combination with the expansion caused by the carbon dioxide generated by the well known water-isocyanate reaction, in particular to use pentane blowing agents, for their cost which is remarkably lower than the blowing agents conventionally used for foaming polyurethane.

An extremely critical point in the use of pentane blowing agents is their high inflammability degree, depending on the concentration of the oxygen in the atmosphere and within the foaming cavity; in fact, pentane, or a mixture of polyol and pentane, releases vapours which, if mixed with suitable amounts of oxygen in the air may give rise to an explosion when a priming cause occurs, for example a spark generated by an electrostatic charge inside the cavity between the exterior shells of the panel.

In order to prevent these severe inconveniences, it is generally necessary to detect the presence of these vapours and to provide alarm signals when pentane vapours are present in dangerous concentrations. With the conventional foaming technologies, by using pentane as blowing agent, it is therefore essential to provide suitable control devices to allow for detecting or revealing the presence of pentane, even in a very low concentration in the working area or in the proximity of the foaming press. Suitable detectors continuously control the area of their competence and in case pentane molecules are revealed they provide for increasing the environment ventilation and, in extreme cases, for stopping the working of the plant.

To reduce the risk of explosion, EP 0-A-639-441 and JP-07096528 suggest introducing an inert gas, such as Nitrogen, in the foaming space of a refrigerator cabinet, providing Nitrogen injection ports or valves in the jig or in the supporting mold. Again, none of these documents is directed to the production of composite foam panels, nor suggests the use of vacuum assisted foaming and pentane blowing agent for the purpose of the present invention.

Nevertheless the use of pentane involves another problem related to the increase of the viscosity of the polyol in the polyurethane mixture causing difficulties in the foaming of the mixture within the foaming cavity; moreover, the manufacturers are going to put on the market specific polyols for the use of these blowing agents, which renders them more and more viscous. The high viscosity degree of the polyols, and consequently of the polyurethane mixture in a noncontinuous foaming process for the manufacture of insulating panels with conventional foaming technologies, causes in turn difficulties in obtaining a complete filling up of the panel cavity and a homogeneous distribution of mechanical and thermal properties of the foam inside the same panel.

OBJECTS OF THE INVENTION

Accordingly, one object of the invention is to provide a process and an apparatus for the production of panels of the type comprising exterior shells and a structural foam core, which allow for the use of a pentane, in particular cyclopentane, as auxiliary blowing agent, and assisted foaming in order to overcome the previously mentioned drawbacks.

In particular, the main object of the invention is to provide a process and an apparatus for the foaming of insulating panels, by using a polyurethane mixture containing a pentane blowing agent, by which it is possible to reduce, if not substantially eliminate, the risk of causing fires or explosions during the foaming phase, and the subsequent expansion and polymerization phase, allowing at the same time an easy and aided foaming of the polyurethane mixture and a homogeneous filling of the panel cavity in particular panels of large dimensions avoiding voids, improving the bonding of the foam core to the shells and properties of the panels thus obtained.

Another object include providing an extreme simplification of the foaming process obviating the design limitation of the apparatuses previously known.

SUMMARY

What above is attainable by a vacuum assisted foaming process and apparatus for the production of insulating panels, according to independent claims 1 and 7. The invention resides in the use of a special frame for retaining the foam along the peripheral edges of the panel, which allows for feeding in an inert gas before vacuum assisted injection of the polyurethane mixture should occur, meanwhile allowing for a lighter and extremely simplified construction of the foaming press.

Generally, according to the invention, there is provided a process for foaming panels having two exterior shells and an intermediate structural foam core adhered to said exterior shells, in which the exterior shells and a peripheral frame for retaining a foaming mixture of polyurethane material comprising a pentane blowing agent define a foaming cavity disposed between the platens of a molding press, the process including the steps of:

- disposing the peripheral frame sealingly arranged around the peripheral edges of shells between the platens of the press;
- providing said peripheral frame with an interior channel having venting ports opening toward said foaming cavity;
- connecting the foaming cavity to an inert gas source through the channel and the venting ports and injecting an inert gas quantity to reach an oxygen concentration below an explosion limit;
- connecting the foaming cavity to a vacuum source through the interior channel and venting ports of the peripheral frame, to generate a vacuum degree inside said foaming cavity;
- injecting the pentane containing polyurethane mixture into the inert foaming cavity of the panel from a side of the peripheral frame; and
- allowing the polyurethane material to foam and to flow into the inert cavity of the panel, by maintaining vacuum conditions inside said foaming cavity.

According to another aspect of the invention, there is provided an apparatus for foaming panels comprising a press having upper and lower platens in combination with a foam retaining peripheral frame disposed between the platens of the press, said peripheral frame being peripherally arranged and tightly pressed between two platens of the press, characterized by comprising

- a double walled peripheral frame having inner and outer peripheral walls; the inner and outer walls of the frame being spaced apart to define an interior channel peripherally extending along the sides of the frame and venting holes to connect said channel with the foaming cavity;
- a manifold parallely extending to the peripheral frame and connected to the channel by a plurality of spaced apart connecting ducts;
- and valve control means being provided to selectively connect the manifold to an inert gas source (46), respectively to a vacuum source

BRIEF DESCRIPTION OF THE DRAWINGS

The process and the apparatus according to the invention will be better illustrated hereinafter with reference to the accompanying drawings, in which.

DETAILED DESCRIPTION OF THE INVENTION

Figure 1:
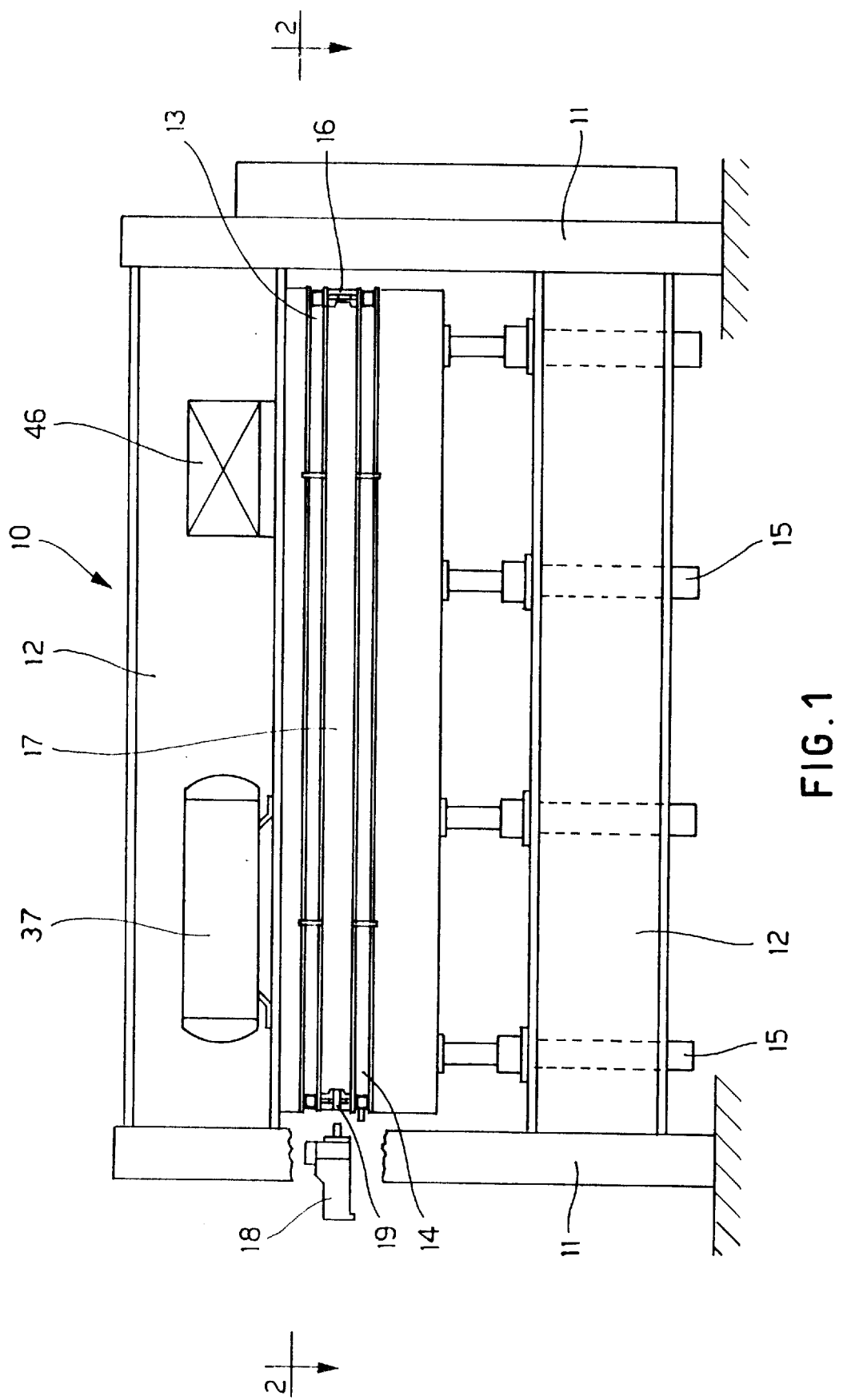
FIG. 1 is a side view of a panel foaming press according to the invention.

As shown in FIG. 1, a press for foaming panels substantially comprises a rigid structure 10 having vertical uprights 11 joined by beams 12 for supporting an upper platen 13 directly fastened to the upper beams 12 of the press, and a lower platen 14, which is vertically movable between a lower and an upper position by a plurality of hydraulic cylinders 15, as schematically shown.

Reference number 16 in FIGS. 1 to 3 relates to a special peripheral frame, peripherally arranged around a panel to be foamed for retaining a foaming polyurethane mixture, injected or fed into a foaming cavity of the panel; the frame 16 is tightly disposed between the opposing surfaces of the two platens 13 and 14 of the press, in such a way to define a closed space or a foaming cavity 17 as explained hereinafter.Reference number 18 in FIG. 1 lastly refers to a mixing head for preparing a polyurethane mixture containing a pentane blowing agent, which is injected into the closed cavity of a panel, through an injection hole 19 provided on a side of the peripheral frame 16.

Figure 2:
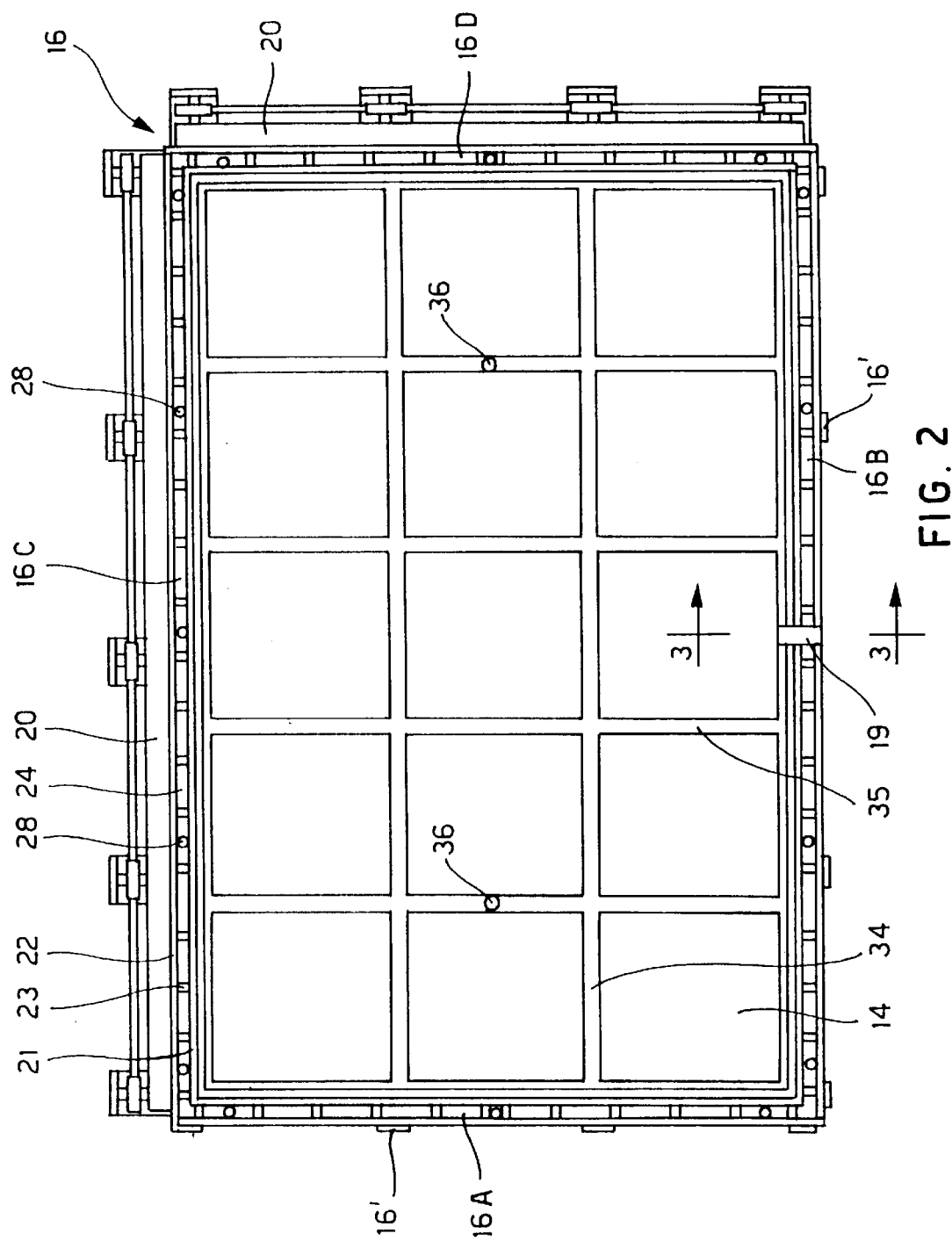
FIG. 2 is a top view along line 2—2 of FIG. 1.

As shown in FIG. 2, some sides of the frame 16, for example the sides indicated by reference numbers 16A and 16B, are fixedly fastened to one of the two pressing platens by fastening means 16', while the remaining sides 16C and 16D are removably fastened, each one being connected to a respective removing system 20 in order to allow for the removal of a finished panel.

The apparatus for foaming insulating panels according to the invention, and its working mode, will be hereinafter described in detail with specific reference to FIGS. 3 and 4. As previously stated, the apparatus comprises a peripheral frame 16, for retaining the expanding foam, till the removal of the panel from the molding press.

According to the invention, the use of a double walled frame 16 has been suggested to carry out more integrated operative functions; such as foam retention, feeding an inert gas, for example Nitrogen, to avoid explosion risks in case of use of a pentane blowing agent and air suction for vacuum generation in the panel foaming cavity.

Figure 3:
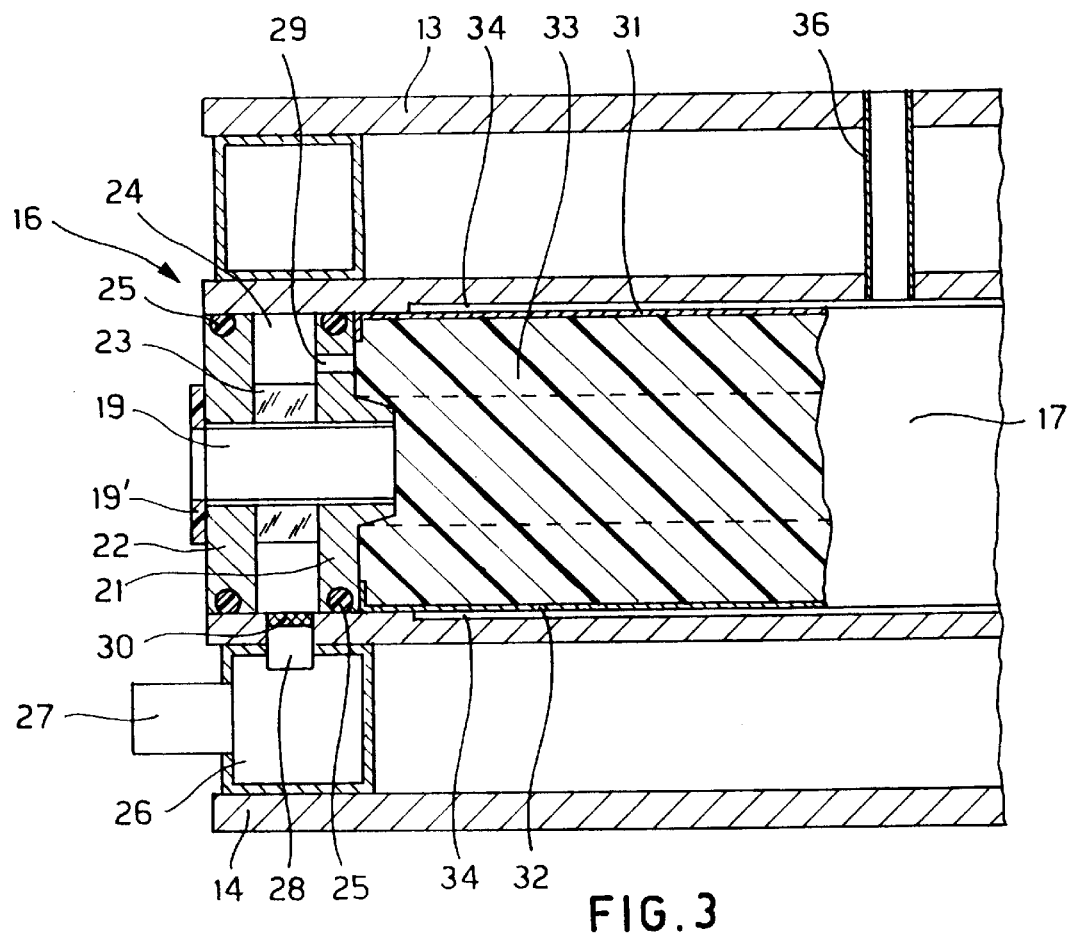
FIG. 3 is an enlarged sectional view along line 3—3 of FIG. 2.
Figure 4:
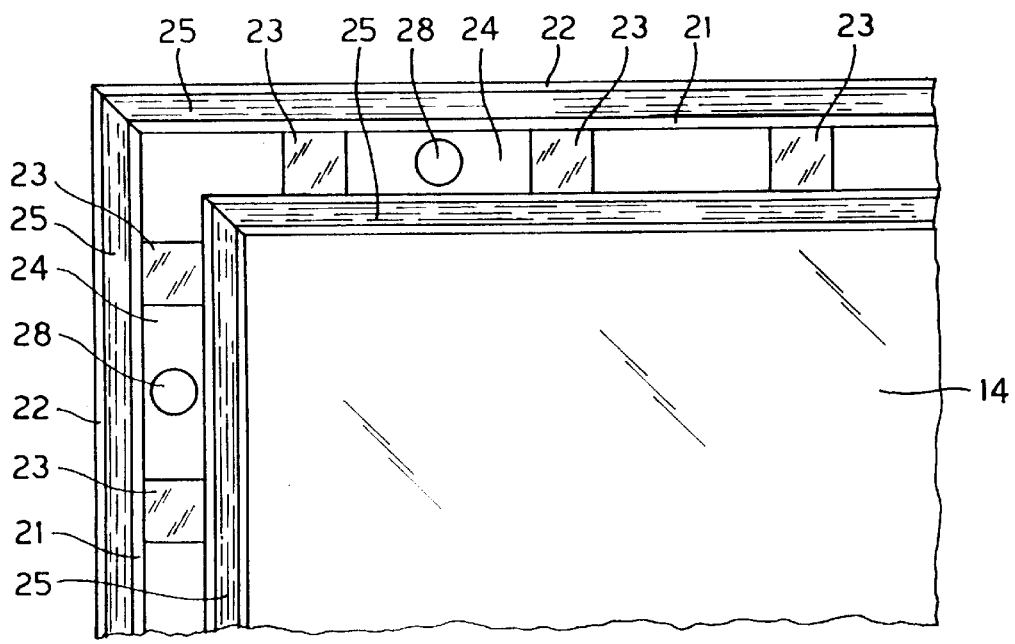
FIG. 4 is an enlarged view in correspondence of a corner of FIG. 2.

In particular, as shown in FIGS. 3 and 4, each side of the frame 16 comprises an inner wall 21 and an outer wall 22, suitably spaced apart and connected among them by spacer members 23; in this way between the inner and outer walls of the frame 16 an interior channel 24 is provided longitudinally extending on each side of a panel to be produced.

As shown in FIGS. 3 and 4, along the upper edges and respectively along the lower edges of the two walls 21, 22 of the frame 16, longitudinal slots are provided for seating gaskets 25 to tighten the foaming cavity 17 of the panel, respectively the peripheral channel 24 inside the frame 16, by simply closing and urging the platens 13 and 14 of the press against the wall edges of the same frame 16. An injection hole is provided by a fitting 19, opening into the cavity 17, passing through both walls 21, 22 on a side of the frame 16 for allowing the injection of a liquid or frothed polyurethane mixture, into the panel cavity 17 by the mixing head 18; in turn the channel 24 may be selectively connected to an inert gas source 46 and to an external vacuum source 37 through a manifold 26 embedded in one of the two platens 13 and 14 of the press, as explained further on.

In this regard, and as shown in FIG. 3, one of the press platen, for example the lower platen 14, in correspondence of its peripheral edges is provided with a tubular manifold 26 and a pipe fitting 27 for the connection to the inert gas source 46 or respectively to the external vacuum source 37; the manifold 26 furthermore is connected to the lower side of the channel 24, by a plurality of uniformly spaced apart connecting ducts 28, which open flush to the upper surface of the press platen 14.

Correspondingly, the inner walls of the frame 16 are provided with a plurality of venting holes 29 which allow for the connection between the channel 24 and the foaming cavity 17 of the panel.

Reference number 30 in FIG. 3 refers to a filter inside each connection duct 28 between the manifold 26 and the channel 24.

As shown in the enlarged detail of FIG. 3, a panel substantially comprises two exterior shells 31, 32 defining the outer faces of the panel, made for example in iron sheet or other suitable material, and an intermediate structural core 33 in thermally and/or acoustically insulating foamed material; in particular, the core 33 is constituted by a rigid foam obtained from a polyurethane mixture which is fed by the mixing head 18 and injected in a liquid or frothed form and in metered quantity, inside the cavity 17 of the panel, said cavity being defined by two opposing shells 31 and 32 suitably spaced apart by spacers (not shown) to rest on the faces of the two platens 13 and 14 of the press and by the frame 16 peripherally arranged around the edges of both shells.

The polyurethane material with the blowing agent is injected in a remarkably lower quantity than the volume of the cavity 17, which will be then completely filled up by the polyurethane foam at the end of the expansion phase.

However, before injecting the polyurethane mixture, in case a pentane blowing agent is used, it is necessary to inert the panel cavity 17, by injecting an inert gas, for example Nitrogen, which saturates the foaming space 17 to reduce the oxygen concentration at a value lower than an explosion limit, preventing any reaction with the pentane, to avoid the oxygen/pentane mixture from reaching molar ratios which could cause an explosion.

As, in general, large quantities of Nitrogen are to be injected in relatively short periods, to reduce the working cycle, according to the present invention, the inert gas is injected into the panel cavity 17 through the same foam retaining frame 16, which is successively used for the vacuum assisted foaming.

In fact, to facilitate the foaming mixture to flow and the filling of the panel cavity 17, after the injection of the inert gas, according to the present invention, a vacuum degree at a desired value is provided in the same foaming cavity 17, by sucking the air along the periphery or sides of the panel cavity 17 through the venting holes 29, the channel 24 of the annular frame 16, conduit 28 and the manifold 26; this fact allows for a homogeneous distribution of the foamed material of the core 33 avoiding bubble or pin-hole formation and making the same foam core 33 strongly adhere to the surfaces of the exterior shells 31, 32.

Depending on the process conditions and on the nature of the polyurethane mixture, the injection of the mixture can be performed contemporaneously with or subsequently the time at which vacuum is started; the same vacuum can be maintained for the only expansion phase of the polyurethane mixture, or for a remarkably longer time sufficient to bring the polyurethane foam to an advanced polymerization level, wherein the foam cells have assumed a substantially stable configuration. If desired, in order to speed up the inert gas blowing in, a certain vacuum degree in the panel cavity could be previously performed.

The use of vacuum, during the foaming of a panel, in particular for panels of large dimensions, sometimes under the vacuum effect inside the panel, could cause difficulties in obtaining a planarity of the outer faces as the two shells, which would tend to bend or to bulge inside the panel, causing the formation of panels with a non homogeneous thickness and therefore commercially unacceptable.

According to another aspect of the present invention, in order to attain a perfect planarity of the outer faces of the foamed panels, in combination with the vacuum applied inside the cavity 17, a pneumatic system has been provided to sustain the two shells 31 and 32, which are retained by continuous air suction against the faces of two platen 13 and 14 of the press.

In this regard, as shown in the top view of FIG. 2 and in the cross sectional view of FIG. 3, the front face of each plane 13, 14 is provided for example with a plurality of longitudinal slots 34 crossing with a plurality of transversal slots 35 in such a way to define a kind of suction net for the shells 31 and 32; the slots 34 and 35 are therefore connected to an air suction source by connectors 36 which open at specific points of the slots 34 and/or 35 of each platen 13, 14 of the press.

In this way the two shells 31 and 32 of the panel can be pneumatically retained or blocked against the surface of the two platens 13 and 14 of the press, by maintaining a continuous connection with the air suction source, both during the feeding of the inert gas and the polyurethane mixture injection, and the vacuum assisted expansion of the foam, as well as should it be necessary during part of the time for the polymerization of the foam.

Figure 5:
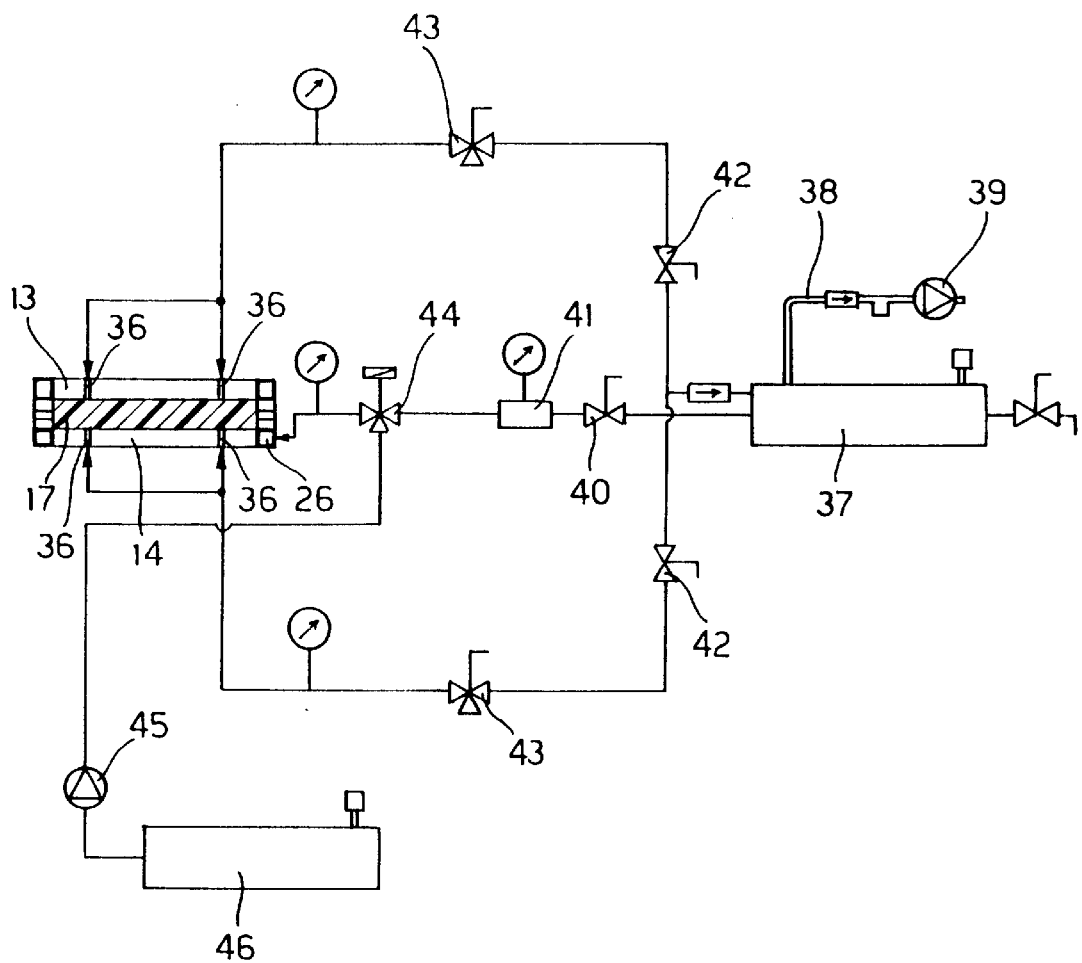
FIG. 5 shows the diagram of the circuit for vacuum generation and for feeding an inert gas inside the panel foaming cavity.

FIG. 5 of the drawings schematically shows the pneumatic circuit for selectively feeding the inert gas and for the vacuum generation inside the foaming cavity 17 of the panel, as well as for pneumatically sustaining the two outer shells 31 and 32.

The circuit substantially comprises a vacuum tank 37 connected, by a duct 38, to a suction pump 39 for generating a desired vacuum degree inside the same tank 37.

The vacuum tank 37, in turn is connected, by a valve 40, a pressure reduction unit 41, and a three-way valve 44 to the fitting 27 of the manifold 26 in the lower platen 14 of the press.

The vacuum tank 37 is further connected, by the valves 42 and 43, to air suction connectors 36 for sucking the air between each platen 13 and 14 of the press and the corresponding shell of the panel. The valve 43 is a three-way valve for allowing reinstatement of the atmospheric pressure on the two sides of the panel at the end of the polymerization process, when the finished panel is to be removed.

In FIG. 5 reference number 46 refers to a tank for storing an inert gas, constituted for example by liquid Nitrogen which is fed to the manifold 26 by a pump 45, through the three-way valve 44, by which it is therefore possible to selectively connect the panel cavity 17 to the vacuum tank 37 or to the inert gas tank 46.

The process for foaming panel according to the invention is characterized therefore by the following working steps:

after providing for the required operations for preparing the panel, by arranging and sustaining the two shells 31 and 32 against the surfaces of the two platens 13 and 14 of the press, making them pneumatically adhere in a perfectly planar condition; as well as after positioning the foam retaining frame 16 peripherally against the edges of the two shells and in correspondence of the ducts 28 in connection with the manifold 26, the two platens of the press are closed and tightly pressed against the frame 16, then the inert gas is blown in. The mixing head 18 in the meantime is suitably prearranged in the injection hole 19 to tighten the same and thrust against the front gasket 19'.

At this point the valve 44 is changed over to stop the feeding of the inert gas and to set the connection for vacuum tank 37; then, by acting on the valve 40, the foaming cavity 17 of the panel is connected to the vacuum tank 37, through the venting holes 29, the channel 24 of the peripheral frame 16, the connecting ducts 38 and the manifold 26; the connection of the cavity 17 and of the slots 34, 35 of the two planes to the vacuum source will be continued for the required time, by maintaining the vacuum pump 39 in operation.

After the vacuum generation into the foaming cavity 17 of the panel, or when the desired vacuum degree has been attained, a metered quantity of polyurethane mixture is injected which will begin to expand; the expanding mixture, under the vacuum effect, will quickly flow and fill in the entire panel cavity 17 in a homogeneous way, without any explosion risk for the panel which has been conveniently made inert. When the foam has become hardened or partially cured, the frame 16 may be opened and panel removed to complete curing or to perform successive operations on the same panels; instead of a press for single panel production the invention may advantageously be applied to a multi-platen press, without departing from the innovative principle of the present invention.

What is claimed is:

1. A process for foaming panels having two exterior shells and an intermediate structural foam core adhered to said exterior shells, in which the exterior shells and a peripheral frame for retaining a foaming mixture of polyurethane material comprising a pentane blowing agent define a foaming cavity disposed between platens of a molding press, the process including the steps of:

disposing the frame sealingly arranged around the peripheral edges of shells between the platens of the press;

providing said frame with an interior channel having venting ports opening toward said foaming cavity;

connecting the foaming cavity to an inert gas source through said channel and the venting ports, and injecting an inert gas quantity to reach an oxygen concentration below an explosion limit so as to obtain an inert foaming cavity;

connecting the foaming cavity to a vacuum source through the channel and venting ports of the frame, to generate a vacuum degree inside said foaming cavity;

injecting the pentane containing polyurethane mixture into the inert foaming cavity of the panel from a side of the peripheral frame; and allowing the polyurethane material to foam and to flow into the inert foaming cavity of the panel, by maintaining vacuum conditions inside said foaming cavity.

2. The process according to claim 1, wherein the blowing agent is cyclopentane.

3. The process according to claim 1, wherein the vacuum is applied to the foaming cavity before feeding the inert gas.

4. The process according to claim 1, wherein the vacuum is applied to the foaming cavity of the panel at the start of and during the injection of the polyurethane mixture.

5. The process according to claim 1, wherein the vacuum is applied to the panel foaming cavity, successively to the injection of the polyurethane mixture.

6. The process according to claim 1, wherein the vacuum is applied inside the foaming cavity of the panel by sucking air along peripheral edges of the foaming cavity.

* * * * *